March 27, 1934.   W. L. BEALL   1,952,486
TRACTOR PLOW
Filed Jan. 6, 1933   4 Sheets-Sheet 3

Inventor
William L. Beall
By N. P. Darlick Atty.

March 27, 1934.  W. L. BEALL  1,952,486
TRACTOR PLOW
Filed Jan. 6, 1933  4 Sheets-Sheet 4
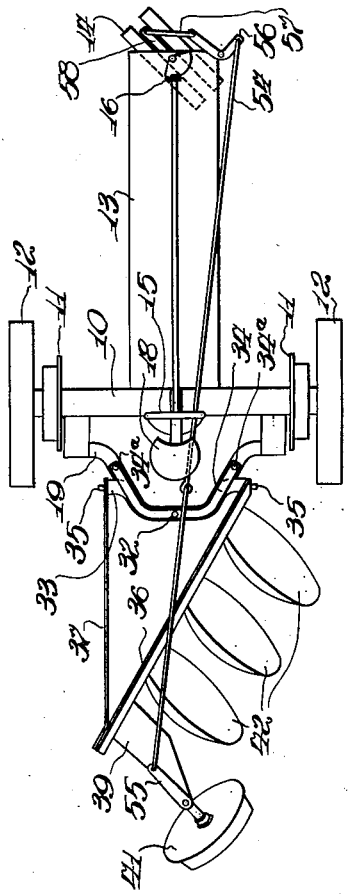
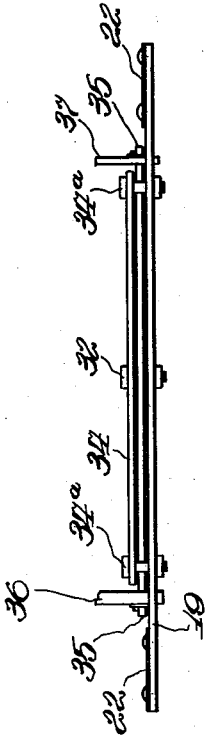
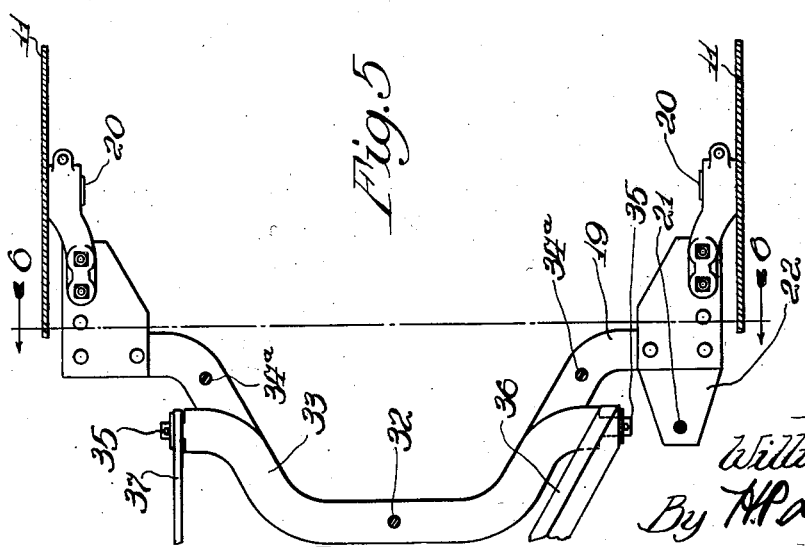
Inventor
William L. Beall Patented Mar. 27, 1934

1,952,486

UNITED STATES PATENT OFFICE 1,952,486

TRACTOR PLOW

William L. Beall, Chattanooga, Tenn., assignor to International Harvester Company, a corporation of New Jersey Application January 6, 1933, Serial No. 650,415

8 Claims. (Cl. 97—47)

This invention relates to tractor propelled tillage implements, and more particularly to improved means for mounting direct connected implements on the rear of a tractor.

The main purpose of the invention is to provide a form of connection between a tractor and an implement, such as a gang plow, that will act to yieldably maintain the implement in correct working position when in operation and yet allow it to be quickly placed in nonoperating, or raised, position for turning or during transport. Another purpose is to embody in the connecting structure, means for permitting either the front or rear of the implement carrying frame to move upwardly against spring pressure when irregular ground is being worked. More specifically, it is an object of the invention to simplify and improve the structure and mode of operation of direct connected disk gang plows of the type having a castering, rear furrow wheel coupled up and controlled by steering movements given to the tractor steering means.

The desired results and advantages are attained by the organization and details of construction hereinafter described and claimed and in which the invention resides, the same being illustrated by the accompanying drawings, where:

Figure 4 is a plan view illustrating the action of the steering means;

Figure 5 is a detail plan view of the connection between the plow and the tractor drawbar; and, Figure 6 is a section on the line 6—6 of Figure 5.

Figure 1:
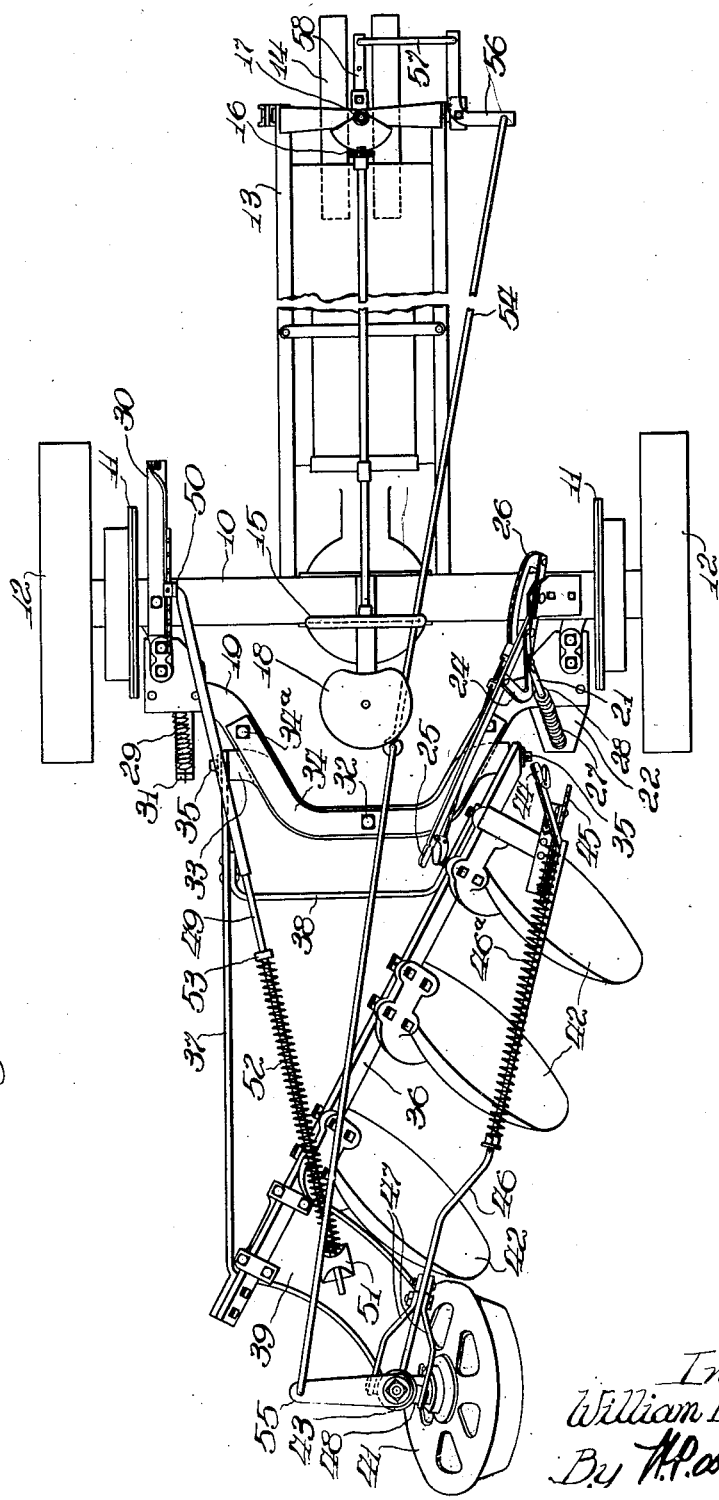
Figure 1 is a plan view of a tractor plow embodying the invention.

The tractor and implement organization in which the invention resides is herein disclosed in connection with a high frame, or row crop, type of tractor having a wide tread rear axle structure comprising on axle housing 10 with depending end housings 11 on the outer sides of which the traction wheels 12 are mounted. The body 13 of the tractor is centrally secured to the axle housing 10 and is supported at its forward end on a dirigible truck 14 which has a vertical shaft mounted on the front portion of the tractor actuated to effect steering of the truck by means of a steering wheel 15 working through suitable gearing at 16 mounted in a bracket 17 at the front of the tractor and cooperating with the vertical steering shaft of the truck. A seat for the operator is provided adjacent the steering wheel at 18.

Figure 2:
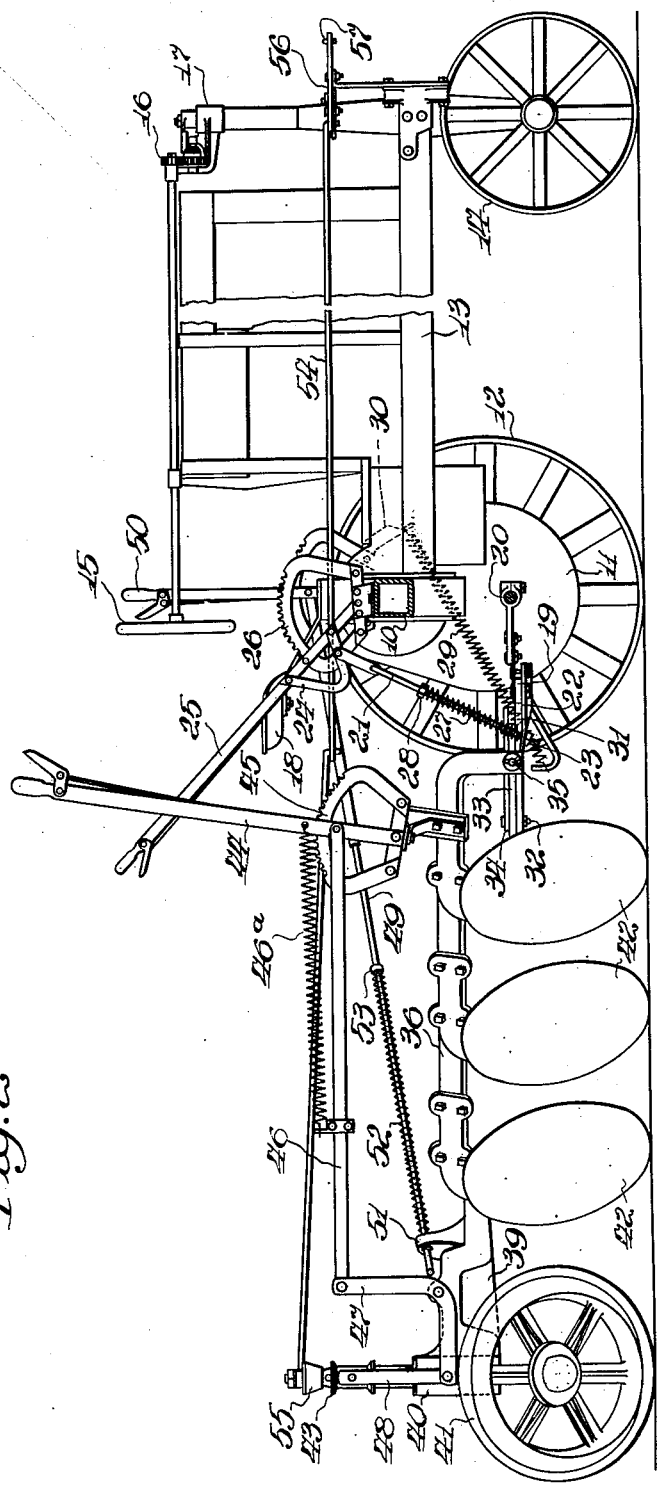
Figure 2 is a side elevation thereof, with the plow shown in lowered position.
Figure 3:
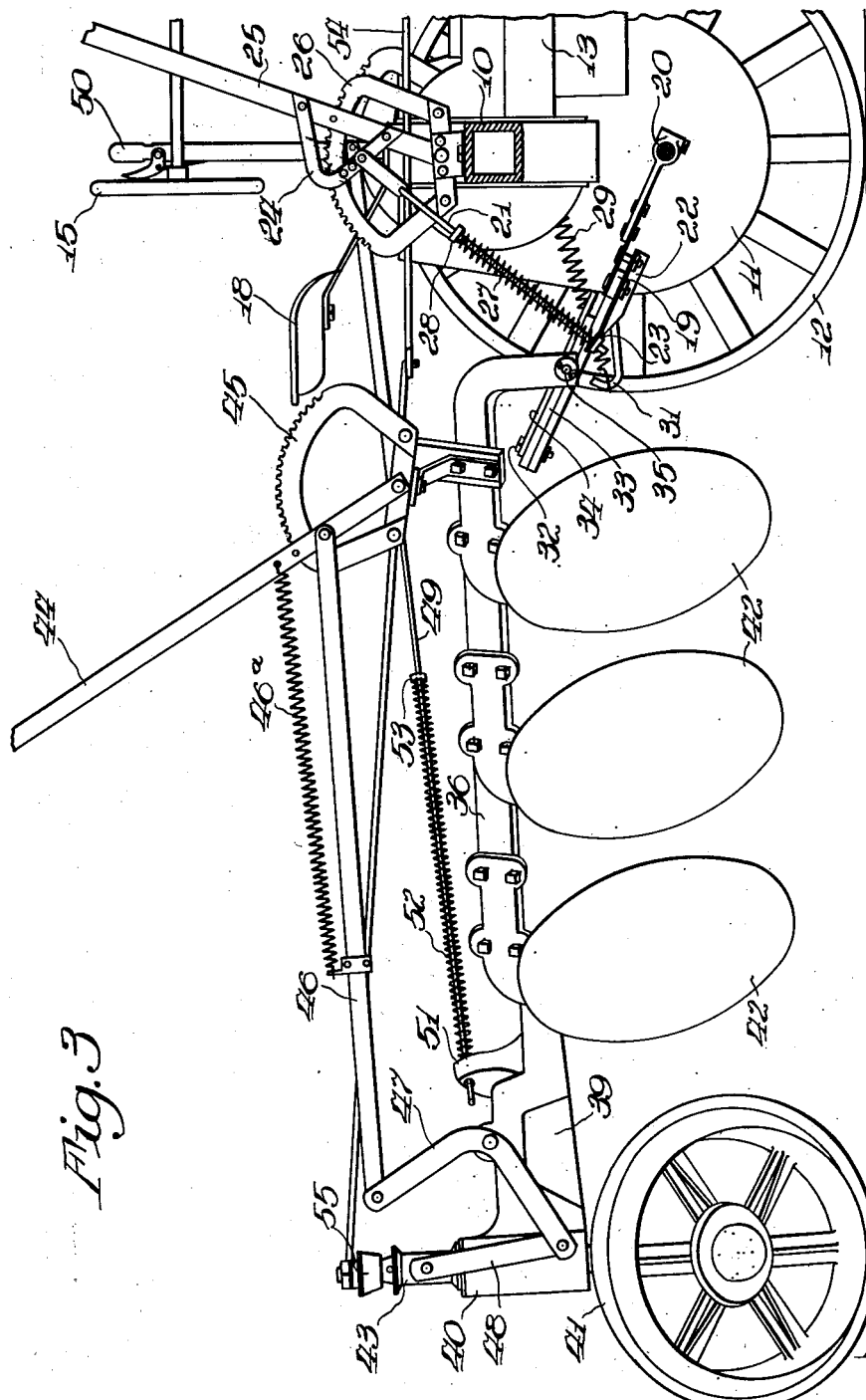
Figure 3 is an enlarged side view, showing the plow raised.

In carrying out the present invention, a rearwardly extending U-shaped main drawbar 19 is provided on the tractor, the arms of which are pivoted on horizontal pintles 20 extending from the inner surfaces of the depending housings 11 of the axle structure. This drawbar is vertically swingable and is supported by a suspension link 21, the lower end of which passes through an opening in a rearwardly extending supporting plate 22 secured to one of the arms of the drawbar. The link is provided with a stop nut 23 for engagement with the under side of the plate 22, thus supporting the drawbar, but allowing it to swing upwardly. At its upper end the suspension link 21 is pivotally connected to a projecting arm 24 on a hand lever 25 mounted on one end of the axle housing 10, which lever cooperates with the usual locking rack 26. The suspension link 21 carries a coil spring 27 confined between a stop collar 28 thereon and the upper surface of the supporting bracket 22. This spring normally resists upward movement of the drawbar 19 when the same is thrust upward by action of the implement attachment to be described. In order to assist the raising of the drawbar when it is carrying a load, a suitable tension spring acting in opposition to the spring 27 may be provided. In the present instance such a spring is shown in Figures 1, 2 and 3 on the opposite side of the drawbar from the suspension link 21 and designated 29, this spring extending from a suitable anchor arm on the tractor at 30 to a similar arm 31 secured to the main drawbar. It will be understood, of course, that the downward pressure of the spring 27 is at all times greater than the pull of spring 29. At its rear or bight portion, the main drawbar has pivotally mounted on it, by means of the vertical pivot bolt 32, a transversely extending auxiliary drawbar 33, the arms of which extend slightly beyond the arms of the main drawbar at each side, as seen in Figures 1 and 5. A top or cover bar 34, which is secured in spaced relation to the main drawbar, is preferably provided to extend over the auxiliary drawbar. This bar 34 is secured to the main drawbar by the pivot bolt 32 and by end bolts 34ª, the latter acting as stops limiting the swinging range of the auxiliary drawbar. The ends of the auxiliary drawbar are provided with horizontal pintles at 35, which serve to pivotally support the forward ends of the side members of a rearwardly extending implement frame, the forward end of which is wholly supported on the drawbar. In the present instance this implement frame is shown as a disk gang plow comprising a main beam or bar 36 pivoted on one end of the auxiliary drawbar 33 and extending diagonally rearwardly to its connection with a secondary frame bar 37, the forward end of which is pivoted on the other end of the auxiliary drawbar. The bars 36 and 37 extend rearwardly in converging relation, as shown, and are secured together at their rear ends. A transverse brace 38 secures these bars intermediate their ends. Near its rear end the main beam 36 is provided with a laterally extending bracket or casting 39 formed with a vertical, tubular bearing sleeve 40 on its end. The sleeve 40 slidably and rotatably receives the upright standard of a furrow wheel 41, which forms a ground engaging support for the rear end of the implement frame. The main frame beam 36 has adjustably clamped thereto the standards for a series of plow disks 42 arranged as usual in disk gang plows, the rearmost disk of the series forming the furrow in which the wheel 41 travels. The standard of the wheel 41 turns in a bushing 43 which is slidable vertically in the sleeve 40. The bushing 43 and, therefore, the furrow wheel is adjusted vertically by means of a hand lever 44 mounted on the forward end of the main beam 36 of the frame and cooperating with a locking rack 45. The lever 44 is connected by means of a rearwardly extending link 46 with a bell crank lever 47 pivoted on the bracket 39, which is in turn pivoted to a lifting link 48 on the bushing 43. Rearward swing of the lever will accordingly lift the rear end of the frame on the furrow wheel 41, which action may be assisted by a coil spring 46ª. In order to yieldably hold the rear end of the plow frame down, there is provided a thrust rod 49 connected at its forward end to a hand lever 50 on the axle structure of the tractor and having its rear end slidably received in an opening in an upstanding lug 51 on the furrow wheel bracket 39. The thrust rod 49 carries a compression spring 52 which is confined between the lug 51 and a set collar 53 on the thrust rod. The lever 50 carrying the front end of the thrust rod 49 is offset laterally from the lug 51 and is also above it, so that the thrust of the spring 52 on the rear end of the plow frame is both downward and sideward in opposition to the side thrust of the soil on the plow disks.

It will be seen from the structure so far described that the connection between the tractor and implement frame, while permitting vertical movement between them, allows only a limited movement about the pivot 32, and in order to effect short turns of the tractor and plow after the plow has been raised, there has been provided a connecting rod 54 preferably formed in connected sections, the rear end of which is connected to a lateral arm 55 secured to the upper end of the standard of the furrow wheel 41. The front end of this rod is secured to the laterally extending arm of the horizontal bell crank lever 56 suitably supported on the forward end of the tractor, the other arm of which is connected by a link 57 with a forwardly extending arm 58 fixed on the vertical steering shaft of the truck 14. With this arrangement, steering movement imparted to the truck, as shown in Figure 4, will correspondingly turn the furrow wheel 41 and cause it to assume a direction of travel which is substantially on an arc centering at the traction wheel of the tractor which is on the inner side of the turn being made.

With the construction and arrangement of parts described, it will be clear that the plow, when in lowered or operating position, as shown in Figure 2, will be yieldably held down to its work by the spring pressure exerted on the main drawbar by spring 27 and on the rear end of the plow by the spring 52, but that either the front or rear ends of the plow frame may rise upwardly against the pressure of these springs as necessitated by irregularities of the soil or by obstructions therein. It will also be seen that the entire plow frame may be raised to the position of Figure 3 by first swinging the lever 25 forwardly, thereby lifting the main and auxiliary drawbars and the front end of the implement frame, and thereafter swinging the lever 44 rearwardly to elevate the rear end of the frame on the furrow wheel 41. In this elevated position the plow is ready for transport and the plow and tractor can be readily turned on a short radius by reason of the connection between the dirigible truck and the rear furrow wheel.

The foregoing construction illustrates a preferred embodiment of the invention, which may, however, be varied without departure from the scope of the invention as defined in the following claims.

What is claimed is:

1. In a tractor plow, the combination with a tractor of an implement carrying frame extending rearwardly behind the tractor, a vertically swingable drawbar on the tractor, a transverse pivotal connection between the front end of said implement frame and the drawbar forming the sole support for the front of the frame, a ground engaging support on the rear end of the frame, and means on the tractor for yieldably maintaining the front end of the implement frame in lowermost position.

2. In a tractor plow, the combination with a tractor of an implement carrying frame extending rearwardly behind the tractor, a vertically swingable drawbar on the tractor, a transverse pivotal connection between the front end of said implement frame and the drawbar forming the sole support for the front of the frame, a ground engaging support on the rear end of the frame, and separately adjustable devices on the tractor for applying downward spring pressure to the drawbar and to the rear end of the implement frame.

3. In a tractor plow, the combination with a tractor of an implement carrying frame extending rearwardly behind the tractor, a vertically swingable drawbar on the tractor, a transverse pivotal connection between the front end of the implement frame and the drawbar forming the sole support for the front end of the frame, a vertically adjustable ground engaging support on the rear end of the implement frame, lift mechanism on the tractor for swinging the drawbar to lift and lower the implement frame by tilting it on its ground engaging support, and means on the implement frame for vertically adjusting the frame on said support.

4. In a tractor plow, the combination with a tractor of a rearwardly extending arched drawbar pivoted on the rear axle structure of the tractor for movement vertically, a plow carrying frame comprising side members the forward ends of which are pivotally mounted on the rear portion of said drawbar on a horizontal transverse axis, a ground engaging support on the rear end of the plow carrying frame, means between the tractor and the drawbar for yieldably resisting upward swing of the drawbar, and means between the tractor and the rear end of the plow frame for yieldably resisting upward movement of said frame.

5. In a tractor plow, the combination with a tractor of an arched main drawbar pivoted on the rear axle structure of the tractor for swinging movement vertically, a secondary drawbar pivoted on the bight portion of the main drawbar on a vertical axis, a plow carrying frame comprising rearwardly extending side members pivoted at their front ends to said secondary drawbar on opposite sides of its pivot to the main drawbar, a ground engaging support on the rear of said plow frame, and means between the tractor and the plow frame for yieldably resisting upward movement of said frame.

6. In a tractor plow, the combination with a tractor of an arched main drawbar pivoted on the rear axle structure of the tractor for swinging movement vertically, means carried by the tractor for fixing the limit of downward swing of said drawbar but allowing it to swing upwardly, a secondary drawbar pivoted on the bight portion of the main drawbar on a vertical axis, a plow carrying frame comprising rearwardly extending side members pivoted at their front ends to said secondary drawbar on opposite sides of its pivot to the main drawbar, and a ground engaging support for the rear of said plow frame.

7. In a tractor plow, the combination with a tractor of a rearwardly extending arched drawbar pivoted on the rear axle structure of the tractor for movement vertically, a secondary drawbar having a vertical pivot on the bight portion of the main drawbar located in the central longitudinal vertical plane of the tractor, said secondary drawbar having projecting ends at each side of the main drawbar, stops on the main drawbar for limiting the range of movement of the secondary drawbar about its pivot, a plow carrying frame comprising rearwardly extending side members pivoted at their front ends by horizontal pivots to the ends of the secondary drawbar, means on the tractor for supporting the main drawbar, and a furrow wheel supporting the rear end of said plow frame.

8. In a tractor plow, the combination with a tractor of a rearwardly extending arched drawbar pivoted on the rear axle structure of the tractor for movement vertically, a secondary drawbar having a vertical pivot on the bight portion of the main drawbar located in the central longitudinal vertical plane of the tractor, said secondary drawbar having projecting ends at each side of the main drawbar, stops on the main drawbar for limiting the range of movement of the secondary drawbar about its pivot, a plow carrying frame comprising rearwardly converging side members having their front ends pivoted on horizontal pivots to the ends of the secondary drawbar, a furrow wheel supporting the rear connected ends of the side members, an adjustable suspension link supporting the main drawbar, a thrust rod having its forward end mounted on the tractor in laterally offset relation to the rear end of the plow frame, an abutment on the rear of the plow frame having an opening loosely receiving the rear end of said rod, and a pressure spring carried by said rod and confined between a stop on the rod and said abutment.

WILLIAM L. BEALL.